(No Model.)

C. C. MARTIN & A. J. SCHLAFFER.
ANIMAL TRAP.

No. 501,953. Patented July 25, 1893.

Witnesses
C. J. Williamson
A. L. Hough

Inventors
Charles C. Martin and
Albert J. Schlaffer
by Franklin H. Hough Atty.

UNITED STATES PATENT OFFICE.

CHARLES C. MARTIN AND ALBERT J. SCHLAFFER, OF WEST FRANKLIN, INDIANA.

ANIMAL-TRAP.

SPECIFICATION forming part of Letters Patent No. 501,953, dated July 25, 1893.

Application filed January 21, 1893. Serial No. 459,192. (No model.)

*To all whom it may concern:*

Be it known that we, CHARLES C. MARTIN and ALBERT J. SCHLAFFER, citizens of the United States, residing at West Franklin, in the county of Posey and State of Indiana, have invented certain new and useful Improvements in Animal-Traps; and we do declare the following to be a full, clear, and exact description of the invention, such as will enable others skilled in the art to which it appertains to make and use the same, reference being had to the accompanying drawings, and to the letters of refererence marked thereon, which form a part of this specification.

This invention relates to certain new and useful improvements in animal traps, and it relates more particularly to that class of traps which are adapted to seize the leg or some other part of the animal and partially crush it. This class of traps are generally known as "steel-traps."

The invention has for its object to improve upon the construction of the jaws of the trap, whereby a more secure grasp upon the animal may be maintained, and in the providing of an improved form of bait or trip-pan whereby in certain cases the use of bait may be dispensed with, and in case bait is used the displacement or loss of the same will be obviated.

To these ends and to such others as the invention may pertain, the same consists in the peculiar features of construction hereinafter described, shown in the accompanying drawings and then specifically defined in the appended claims.

The invention is clearly illustrated in the accompanying drawings, which with the letters of reference marked thereon form a part of this specification, and in which drawings—

Figure 1:
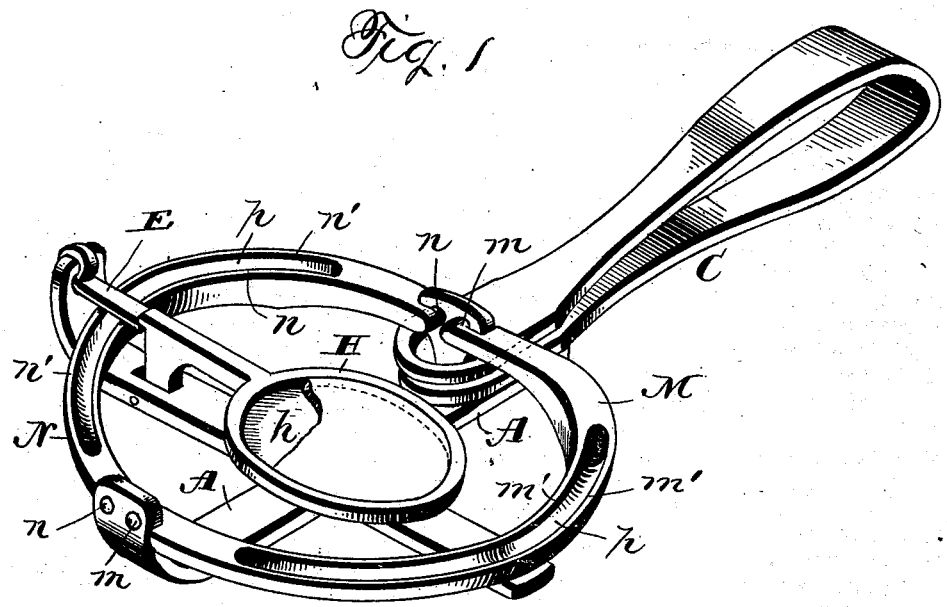
Figure 2:
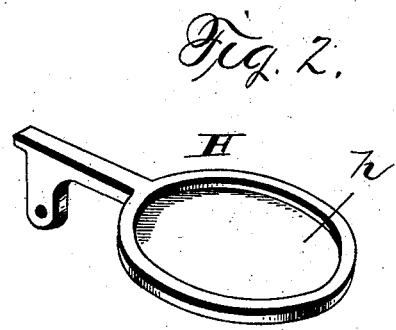

Figure 1, is a perspective view of our improved trap, the same being shown, when set. Fig. 2, is an enlarged detail in perspective, of the bait or trip pan, removed from the trap.

Reference now being had to the details of the drawings by letter, A designates the foundation or fixed frame; M and N the jaws turning on fixed centers $m, n;$ and C is the spring.

E is the lever which holds the jaws open.

Each of the jaws M and N, is provided along the inner face of the jaw, with a groove $p$, thus forming the ridges $m'$ and $n'$ which serve to more securely grasp the leg of the animal held by the trap than would be possible without the groove and ridges described.

It frequently happens that the bait used in trapping is lost, thus rendering the trap useless until a new supply of bait is secured, and when it is considered that trapping is usually carried on in wild and mountainous regions frequently distant from the source of bait supply, the inconvenience, and great loss of time that are involved by the loss of bait will be appreciated.

The essential feature of the present invention is to obviate the difficulty above named, and to provide a bait or trip-pan for use in connection with traps of various forms of construction, and particularly adapted for use in the so called "steel-traps," whereby the use of bait in trapping certain animals; as for instance, the raccoon, may be dispensed with entirely, while in other cases, in which a bait is found to be necessary the bait will be securely retained upon the bait pan, and can not be accidentally lost.

Our bait or trip pan H is of the usual form and size commonly employed in this class of traps, and is pivotally connected with the base portion of the trap frame, in the usual way. The upper face of the pan is depressed or hollowed out, as shown at $h$, and within this dish or depression is placed the bait, in the form of a plastic mass of a nature which adapts it to harden when exposed to the air. We do not limit ourselves to the use of any particular material as bait, but may employ any of the scents or extracts which may be found to be useful, in attracting animals trapped, and mix the same with wax, lard, tallow, or other suitable substance which will permit the bait to be retained in the pan of the trap, as described.

We have found that certain animals are readily attracted to the trap by coloring the pan of the trap white, and hence the upper face of the pan we construct of porcelain or other white substance; thus obviating the use of bait, in trapping for animals which may be thus attracted.

We do not in this application desire to restrict ourselves to the use of traps of any particular size, form of construction, or material, but claim it broadly, in connection with any of the various forms of traps to which it may be found to be applicable.

Having thus described our invention, what we claim to be new, and desire to secure by Letters Patent, is—

1. In an animal trap, a bait or trip pan constructed of porcelain, and having a concavity or dish shaped depression in its upper face whereby it is adapted to receive and hold bait in the form of a plastic mass, substantially as described.

2. In an animal trap a bait or trip pan constructed of porcelain, and having a concave or dish-shaped depression in its upper face, whereby it is adapted to receive and hold bait in the form of a plastic mass, and provided with an integral lateral arm, with depending apertured lug, substantially as described.

In testimony whereof we affix our signatures in presence of two witnesses.

CHARLES C. MARTIN.
ALBERT J. SCHLAFFER.

Witnesses:
F. A. CALDWELL,
PHILIP MARX.